United States Patent
Marri Sridhar et al.

(10) Patent No.: US 10,397,779 B2
(45) Date of Patent: Aug. 27, 2019

(54) SECURE FINE TIMING MEASUREMENT PROTOCOL

(71) Applicant: QUALCOMM Incorporated, San Diego, CA (US)

(72) Inventors: Subash Marri Sridhar, San Jose, CA (US); Carlos Horacio Aldana, Mountain View, CA (US)

(73) Assignee: QUALCOMM Incorporated, San Diego, CA (US)

( * ) Notice: Subject to any disclaimer, the term of this patent is extended or adjusted under 35 U.S.C. 154(b) by 52 days.

(21) Appl. No.: 15/270,883

(22) Filed: Sep. 20, 2016

(65) Prior Publication Data

US 2017/0150354 A1 May 25, 2017

Related U.S. Application Data

(60) Provisional application No. 62/337,274, filed on May 16, 2016, provisional application No. 62/257,932, filed on Nov. 20, 2015.

(51) Int. Cl.
*H04W 12/06* (2009.01)
*H04L 29/12* (2006.01)
*H04W 76/11* (2018.01)

(52) U.S. Cl.
CPC ......... *H04W 12/06* (2013.01); *H04L 61/2038* (2013.01); *H04L 61/2092* (2013.01);
(Continued)

(58) Field of Classification Search
CPC .... H04W 12/06; H04W 76/11; H04L 61/2038
(Continued)

(56) References Cited

U.S. PATENT DOCUMENTS

| 5,825,890 A * | 10/1998 | Elgamal | H04L 29/06 |
| | | | 713/151 |
| 2004/0117657 A1* | 6/2004 | Gabor | H04L 63/0428 |
| | | | 726/4 |

(Continued)

FOREIGN PATENT DOCUMENTS

| WO | 04071127 | 8/2004 |
| WO | 2014046758 A1 | 3/2014 |

(Continued)

OTHER PUBLICATIONS

Stanton K B., "The Use of 802.11 Timing Measurement by p802.1ASbt / p802.1AS-Rev Plus What is asCapable for 802.11 Ports Rev2 Kevin B. Stanton Intel Corporation Jul. 14, 2014, Asbt-Kbstanton-use-of-Timing-Measurement-0714-v02", IEEE Draft, Asbt-Kbstanton-Use-Of-Timing-Measurement-0714-V02, IEEE-SA, Piscataway, NJ USA, vol. 802, No. v02, Jul. 17, 2014 (Jul. 17, 2014), XP068096289, pp. 1-7. [retrieved on Jul. 17, 2014] the whole document.

(Continued)

*Primary Examiner* — Chuck Huynh
(74) *Attorney, Agent, or Firm* — Kilpatrick Townsend & Stockton

(57) ABSTRACT

Techniques disclosed herein are generally directed toward providing at least one security feature for an FTM session. More specifically, an initiating STA can include a security feature in an initial FTM request (iFTMR), determine whether a received FTM frame contains information responsive to the at least one security feature, and complete the FTM session accordingly (including terminating the FTM session if the FTM frame does not contain correct information responsive to the at least one security feature). Embodiments may include a security feature such as nonce values (Continued)

and/or generated (or partially-generated) media access control (MAC) addresses.

27 Claims, 11 Drawing Sheets

(52) U.S. Cl.
CPC ......... *H04L 61/6022* (2013.01); *H04W 76/11* (2018.02); *H04L 61/6004* (2013.01)

(58) Field of Classification Search
USPC ........................................................ 455/411
See application file for complete search history.

(56) References Cited

U.S. PATENT DOCUMENTS

| | | | |
|---|---|---|---|
| 2012/0243638 | A1 | 9/2012 | Maltsev et al. |
| 2014/0266907 | A1 | 9/2014 | Taylor, Jr. et al. |
| 2015/0222602 | A1 | 8/2015 | Steiner et al. |
| 2015/0257120 | A1 | 9/2015 | Prechner et al. |
| 2015/0271776 | A1 | 9/2015 | Michaelovich et al. |
| 2016/0226886 | A1* | 8/2016 | Steiner .................. G01S 5/0063 |
| 2017/0064505 | A1* | 3/2017 | Eyal ...................... H04W 4/023 |
| 2017/0064575 | A1 | 3/2017 | Eyal et al. |
| 2017/0149799 | A1 | 5/2017 | Vamaraju et al. |

FOREIGN PATENT DOCUMENTS

| | | |
|---|---|---|
| WO | 2015047234 A1 | 4/2015 |
| WO | 2015060884 A1 | 4/2015 |

OTHER PUBLICATIONS

Stanton K., et al., "Addition ofp802.11-MC Fine Timing Measurement (FTM)to p802.1 ASRev: Tradeoffs and Proposals Rev 0.1 0 ; as-kbstanton-caldana-ftm-addition-to-1 as-guiding-principles-and-proposal-0315-v1 0", IEEE DRAFT; as Kbstanton-Caldana-FTM-Addition-T0-1 As-Guiding-Principles-And-Proposal-0315-V10, IEEE-SA, Piscataway, NJ USA, val. 802.1 , No. v10, Mar. 9, 2015 (Mar. 9, 2015), XP068083830, pp. 1-22, [retrieved on Mar. 9, 2015].
International Search Report and Written Opinion—PCT/US2017/025104—ISA/EPO—dated Jul. 4, 2017.
Stanton, K., & Aldana, C. (Mar. 9, 2015). Addition of p802.11-MC Fine Timing Measurement (FTM) to p802.1 ARev: Tradeoffs and Proposals. Rev 0.9. IEEE DRAFT presented at IEEE 802.1 Plenary, Berlin, Germany, Mar. 2015. 22 pgs.

\* cited by examiner

SECURE FINE TIMING MEASUREMENT PROTOCOL

RELATED APPLICATIONS

This application claims the benefit of U.S. Provisional Application No. 62/337,274, filed May 16, 2016, entitled "SECURE FINE TIMING MEASUREMENT PROTOCOL," and U.S. Provisional Application No. 62/257,932, filed Nov. 20, 2015, entitled "SECURE FINE TIMING MEASUREMENT PROTOCOL," both of which are assigned to the assignee hereof, and incorporated by reference herein in their entirety.

BACKGROUND

Fine timing measurement (FTM) is a procedure that allows a fixed, portable, or mobile wireless station (STA) to determine its distance from another STA through an exchange of data packets via a wireless data connection (e.g., Wi-Fi®). An FTM session is an instance of a fine timing measurement procedure between an initiating STA and a responding STA. During the FTM session, the distance between STAs can be determined from the length of time it takes for a data packet to travel between STAs and the speed at which the packet travels (the speed of light). An FTM session may include a negotiation, measurement exchange and termination processes.

Traditionally, FTM sessions have been public sessions with no security features. This can make them vulnerable to spoofing attacks in which a snooping STA hijacks an STA session by communicating with the initiating STA in the place of the responding STA. In some instances, this could result in the initiating STA exchanging private information, money, and/or other valuable information with the snooping STA.

SUMMARY

Techniques disclosed herein are generally directed toward providing at least one security feature for an FTM session. More specifically, an initiating STA can include a security feature in an initial FTM request (iFTMR), determine whether a received FTM frame contains information responsive to the at least one security feature, and completing the FTM session accordingly (including terminating the FTM session if the FTM frame does not contain correct information responsive to the at least one security feature). Embodiments may include a security feature such as nonce values and/or generated (or partially-generated) media access control (MAC) addresses.

An example method of providing security in a Fine Timing Measurement (FTM) session between an initiating wireless station and a responding wireless station, according to the description, comprises sending, with the initiating wireless station, an FTM request, where the FTM request includes at least one security feature. The method further includes receiving, at the initiating wireless station, an FTM frame, where the FTM frame comprises a response to the at least one security feature. The method also includes determining, at the initiating wireless station, an authenticity of the response to the at least one security feature, and completing the FTM session.

The method may include one or more of the following features. Completing the FTM session may comprise terminating the FTM session based on a determination that the response to the at least one security feature is not authentic. The determination that the response to the at least one security feature is not authentic may comprise a determination that the FTM frame contains incorrect information responsive to the at least one security feature of the FTM request. Completing the FTM session may be based on a determination that the response to the at least one security feature is authentic. The method may further comprise negotiating a random sequence of nonce values over a secure network, where the at least one security feature of the FTM request comprises at least a portion of the random sequence of nonce values. A validity of the random sequence of nonce values is time dependent. The least one security feature of the FTM request may be included in a vendor-specific information element (IE) within a frame body of the FTM request. The least one security feature of the FTM request may comprise a first media access control (MAC) address, where at least a portion of the first MAC address comprises a first predetermined value. Information responsive to the at least one security feature of the FTM request may comprise a second MAC address, wherein at least a portion of the second MAC address comprises a second predetermined value. No more than three bytes of the first MAC address may comprise the first predetermined value. The method may further comprise receiving an acknowledgement frame, determining an amount of path loss in each of the FTM request and the acknowledgement frame based on information received in the acknowledgement frame, comparing the amount of path loss in the FTM request with the amount of path loss in the acknowledgement frame, and terminating the FTM session if the amount of path loss in the FTM request and the amount of path loss in the acknowledgement frame are not substantially similar. Determining the amount of path loss in each of the FTM request and the acknowledgement frame can comprise determining a transmitted power of the FTM request, receiving, in the acknowledgement frame, an indication of a received power of the FTM request, and a transmitted power of the acknowledgement frame, determining a received power of the acknowledgement frame determining the amount of path loss in the FTM request by subtracting the received power of the FTM request from the transmitted power of the FTM request, and determining the amount of path loss in the acknowledgement frame by subtracting the received power of the acknowledgement frame from the transmitted power of the acknowledgement frame.

An example device, according to the description, comprises an initiating wireless station in a Fine Timing Measurement (FTM) session between the initiating wireless station and a responding wireless station. The device may comprise a wireless communication interface, a memory, and a processing unit communicatively connected to the wireless communication interface and the memory. The processing unit may be configured to cause the device to send, via the wireless communication interface, an FTM request where the FTM request includes at least one security feature, receive, via the wireless communication interface, an FTM frame where the FTM frame comprises a response to the at least one security feature, determine an authenticity of the response to the at least one security feature, and complete the FTM session.

The device may include one or more the following features. The processing unit may be configured to cause the device to complete the FTM session by terminating the FTM session based on a determination that the response to the at least one security feature is not authentic. The processing unit may be configured to cause the device to determine that the response to the at least one security feature is not authentic by determining that the FTM frame contains incorrect information responsive to the at least one security feature of the FTM request. The processing unit may be configured to cause the device to complete the FTM session based on a determination that the response to the at least one security feature is authentic. The processing unit may be further configured to cause the device to negotiate a random sequence of nonce values over a secure network, wherein the at least one security feature of the FTM request comprises at least a portion of the random sequence of nonce values. The processing unit may be further configured to cause the device to include the least one security feature of the FTM request in a vendor-specific information element (IE) within a frame body of the FTM request. The least one security feature of the FTM request may comprise a first media access control (MAC) address, wherein at least a portion of the first MAC address comprises a first predetermined value. The processing unit may be configured to cause the device to receive, via the wireless communication interface, an acknowledgement frame, determine an amount of path loss in each of the FTM request and the acknowledgement frame based on information received in the acknowledgement frame, compare the amount of path loss in the FTM request with the amount of path loss in the acknowledgement frame, and terminate the FTM session if the amount of path loss in the FTM request and the amount of path loss in the acknowledgement frame are not substantially similar. The processing unit may be configured to cause the device to determine the amount of path loss in each of the FTM request and the acknowledgement frame by determining a transmitted power of the FTM request, receiving, in the acknowledgement frame, an indication of a received power of the FTM request, and a transmitted power of the acknowledgement frame, determining a received power of the acknowledgement frame, determining the amount of path loss in the FTM request by subtracting the received power of the FTM request from the transmitted power of the FTM request, and determining the amount of path loss in the acknowledgement frame by subtracting the received power of the acknowledgement frame from the transmitted power of the acknowledgement frame.

An example apparatus for providing security in a Fine Timing Measurement (FTM) session between an initiating wireless station and a responding wireless station, according to the description, may comprise means for sending, with the initiating wireless station, an FTM request where the FTM request includes at least one security feature, means for receiving, at the initiating wireless station, an FTM frame where the FTM frame comprises a response to the at least one security feature, means for determining, at the initiating wireless station, an authenticity of the response to the at least one security feature, and means for completing the FTM session.

The example apparatus may include one or more of the following features. The apparatus of claim 22, wherein the means for completing the FTM session comprises means for terminating the FTM session based on a determination that the response to the at least one security feature is not authentic. The means for completing the FTM session may comprise means for basing the completion of the FTM session on a determination that the response to the at least one security feature is authentic. The apparatus may further comprise means for negotiating a random sequence of nonce values over a secure network, wherein the at least one security feature of the FTM request comprises at least a portion of the random sequence of nonce values. The apparatus may further comprise means for including the least one security feature of the FTM request in a vendor-specific information element (IE) within a frame body of the FTM request. The least one security feature of the FTM request may comprise a first media access control (MAC) address, wherein at least a portion of the first MAC address comprises a first predetermined value. The apparatus may further comprise means for receiving an acknowledgement frame, means for determining an amount of path loss in each of the FTM request and the acknowledgement frame based on information received in the acknowledgement frame, means for comparing the amount of path loss in the FTM request with the amount of path loss in the acknowledgement frame, and means for terminating the FTM session if the amount of path loss in the FTM request and the amount of path loss in the acknowledgement frame are not substantially similar. The means for determining the amount of path loss in each of the FTM request and the acknowledgement frame may comprise means for determining a transmitted power of the FTM request, means for receiving, in the acknowledgement frame, an indication of a received power of the FTM request, and a transmitted power of the acknowledgement frame, means for determining a received power of the acknowledgement frame, means for determining the amount of path loss in the FTM request by subtracting the received power of the FTM request from the transmitted power of the FTM request, and means for determining the amount of path loss in the acknowledgement frame by subtracting the received power of the acknowledgement frame from the transmitted power of the acknowledgement frame.

An example non-transitory computer-readable-medium, according to the description, has instructions embedded therein for providing security in a Fine Timing Measurement (FTM) session between an initiating wireless station and a responding wireless station. The instructions comprise computer code for sending, with the initiating wireless station, an FTM request where the FTM request includes at least one security feature, receiving, at the initiating wireless station, an FTM frame where the FTM frame comprises a response to the at least one security feature, determining, at the initiating wireless station, an authenticity of the response to the at least one security feature, and completing the FTM session.

An example method of providing security in a Fine Timing Measurement (FTM) session between an initiating wireless station and a responding wireless station, according to the description, comprises receiving, with the responding wireless station, an FTM request, where the FTM request includes at least one security feature. The method further includes determining a response to the at least one security feature, and sending, to the initiating wireless station, an FTM frame, where the FTM frame comprises a response to the at least one security feature.

An example device, according to the description, comprises an initiating wireless station in a Fine Timing Measurement (FTM) session between the initiating wireless station and a responding wireless station. The device may comprise a wireless communication interface, a memory, and a processing unit communicatively connected to the wireless communication interface and the memory. The processing unit may be configured to cause the device to receive, with the responding wireless station, an FTM request, where the FTM request includes at least one security feature. The processing unit further may be configured to cause the device to determine a response to the at least one security feature, and send, to the initiating wireless station, an FTM frame, where the FTM frame comprises a response to the at least one security feature.

An example apparatus for providing security in a Fine Timing Measurement (FTM) session between an initiating wireless station and a responding wireless station, according to the description, comprises means for receiving, with the responding wireless station, an FTM request, where the FTM request includes at least one security feature. The apparatus further includes means for determining a response to the at least one security feature, and means for sending, to the initiating wireless station, an FTM frame, where the FTM frame comprises a response to the at least one security feature.

An example non-transitory computer readable medium having instructions embedded thereon for providing security in a Fine Timing Measurement (FTM) session between an initiating wireless station and a responding wireless station, according to the description, comprises computer code for receiving, with the responding wireless station, an FTM request, where the FTM request includes at least one security feature. The instructions further include computer code for for determining a response to the at least one security feature, and sending, to the initiating wireless station, an FTM frame, where the FTM frame comprises a response to the at least one security feature.

BRIEF DESCRIPTION OF DRAWINGS

Non-limiting and non-exhaustive aspects are described with reference to the following figures, wherein like reference numerals refer to like parts throughout the various figures unless otherwise specified.

DETAILED DESCRIPTION

Several illustrative embodiments will now be described with respect to the accompanying drawings, which form a part hereof. The ensuing description provides embodiment(s) only, and is not intended to limit the scope, applicability or configuration of the disclosure. Rather, the ensuing description of the embodiment(s) will provide those skilled in the art with an enabling description for implementing an embodiment. It is understood that various changes may be made in the function and arrangement of elements without departing from the spirit and scope of this disclosure.

As previously indicated, an FTM procedure allows a fixed, portable, or mobile STA to obtain its range with respect to another STA (which may also be fixed, portable, or mobile). However, current FTM protocol contains all public frames, which allows malicious parties to spoof mac addresses and take control of FTM sessions. This can lead to security breach situations if responding or initiating STAs are relying on accurate range measurement for any transactions.

Figure 1:
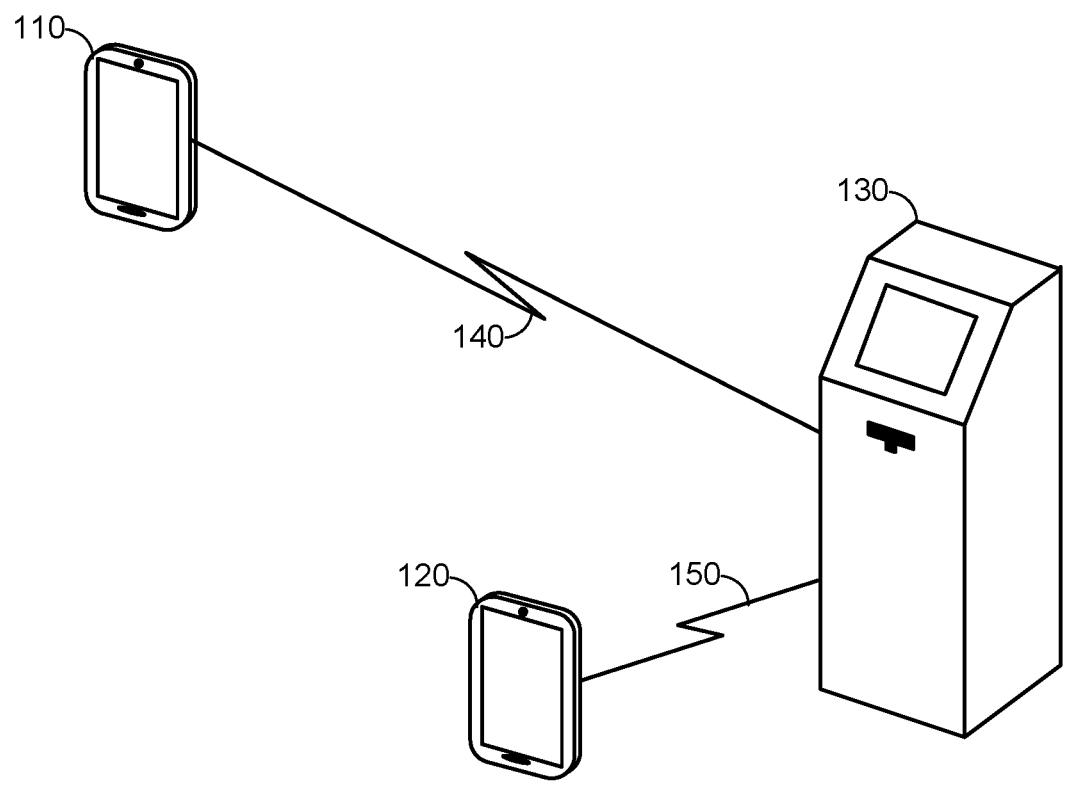
FIG. 1 is a simplified drawing of an example scenario in which security during an fine timing measurement (FTM) procedure may be beneficial.

FIG. 1 is a simplified drawing of an example scenario in which security during an FTM procedure may be beneficial. In this example an ATM 130 is an initiating STA, an authentic mobile device 110 is the intended responding STA, which communicates with the ATM via a first wireless connection 140 (e.g., using Wi-Fi®, Bluetooth®, and/or other wireless technologies). But a snooping mobile device 120 acts as a snooping STA that interferes with a transaction between the ATM 130 and the authentic mobile device 110. The snooping mobile device 120 communicates with the ATM via a second wireless connection 150 (similar to the first wireless connection 140. This could be harmful to the authentic mobile device 110 and/or the ATM 130 in any of a variety of situations.

For example, the authentic mobile device 110 may execute an application that allows a user to withdraw money as he or she approaches the ATM 130 (with the authentic mobile device on his or her person), making money withdrawals much quicker. However, the snooping mobile device 120 may use the application as an opportunity to spoof the transaction and potentially withdraw money from the account of the user of the authentic mobile device. Because FTM is an open protocol, the snooping mobile device 120 can be configured to intercept an FTM request sent by the ATM 130 and conduct an FTM session with the ATM 130 without the knowledge of the authentic mobile device 110.

It will be understood, however, that providing security in FTM sessions can apply to other applications and devices. Although the STAs shown in FIG. 1 include mobile devices 110 and 120 (e.g., mobile phones) and an ATM 130, other types of STAs may be used. The initiating STA, the responding STA, and/or the snooping STA could comprise any of a variety of wireless devices, including (but not limited to) mobile phones, portable media players, personal digital assistants, laptop and/or desktop computers, tablets, wearable devices, and the like. In consumer applications, the initiating STA could, for example, comprise a vending machine, ATM, cash register and/or other point of sale device, and/or the like. A snooping STA may include specialized physical features to attach it to and/or camouflage it against the initiating STA.

Other applications of the techniques provided herein could pertain to instances in which a preauthorized transactions takes place when the distance between two devices is within a certain threshold. For example, a coffee shop may include an initiating STA (e.g., at a point-of-sale device) that, when it determines that a responding STA is within a threshold distance, it will debit a user account and ensure a coffee is prepared so that it is awaiting the user of the responding STA by the time the user enters the coffee shop.

Additional applications are contemplated. Because an FTM session traditionally uses unsecure communications, it may remain a point of vulnerability in applications that use FTM measurements (e.g., to measure the proximity of one STA to another STA). Thus, the techniques described herein for providing security in an FTM session could be utilized not only in banking (as illustrated in FIG. 1), but also in retail sales, transit, venue security, and/or other applications.

Figure 2:
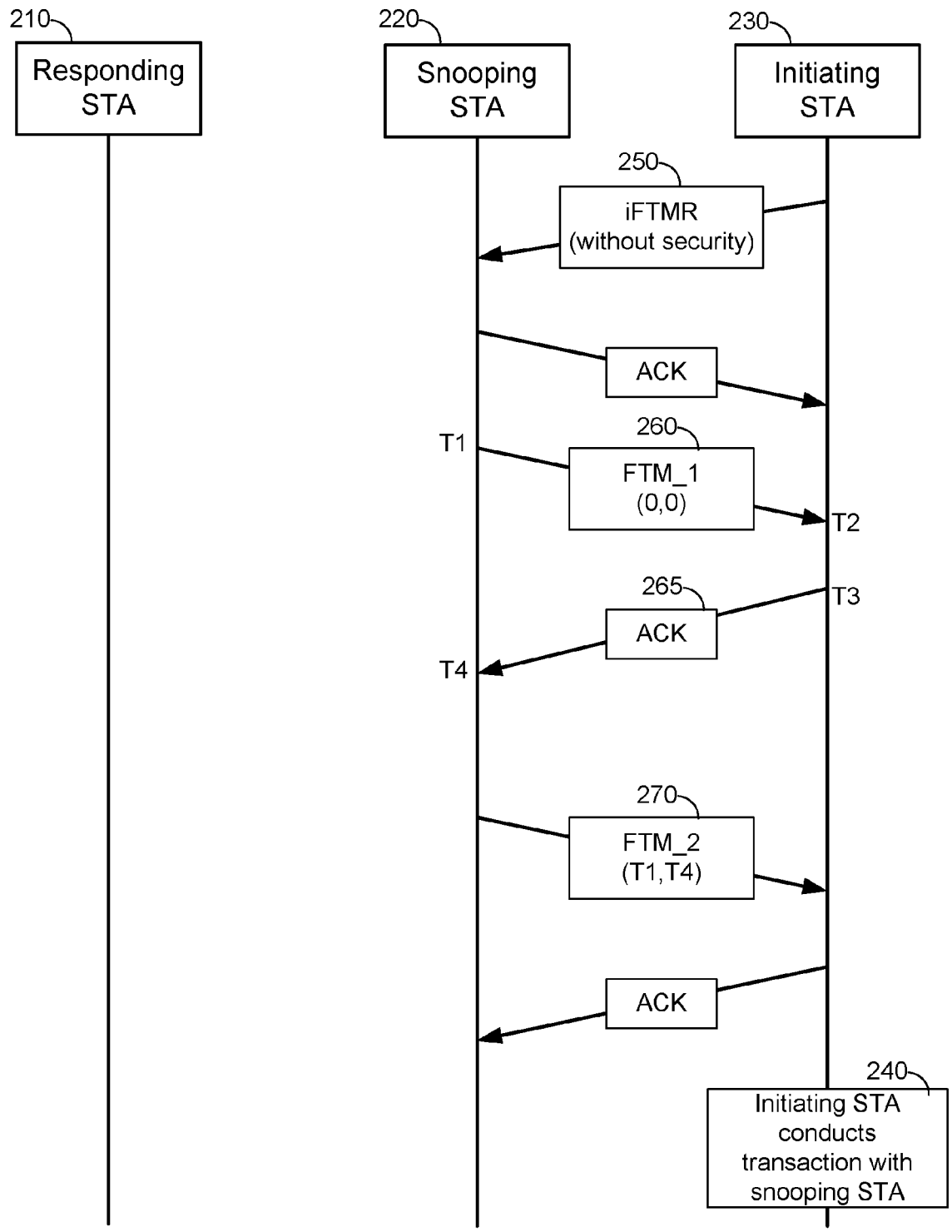
FIG. 2 is a call-flow diagram of an example security breach can take place using the current FTM protocol that uses all public frames for a payment application.

FIG. 2 is a call-flow diagram illustrating how a traditional FTM session between an initiating STA 230 and a responding STA 210 can be hijacked by a snooping STA 220. Here, the initiating STA 230 sends an initial FTM request (iFTMR) 250 without security, which is intercepted by the snooping STA 220. The snooping STA 220 and initiating STA 230 then carry out the entire FTM session without any data exchange between the initiating STA 230 and the responding STA 210 (which is the STA with which the initiating STA 230 intended to conduct the FTM session.

The FTM can be carried out in accordance with governing protocols and standards. FIG. 2, for example, illustrates an FTM exchange in which the iFTMR 250 by the initiating STA 230 is followed by a first FTM frame ("FTM_1") 260 sent by the snooping STA 220 at time T1 and received by the initiating STA 230 at time T2, followed by an acknowledgement frame ("ACK") 265 sent by the initiating STA 230 at time T3 and received by the snooping STA 220 at time T4. The snooping STA 220 then sends a second FTM frame ("FTM_2") 270 that includes times T1 and T4. With times T1, T2, T3, and T4, the initiating STA 230 can then determine a distance of the snooping STA 220 by determining the time of flight of the exchange of FTM_1 260 and corresponding ACK frame 265. Again, FTM sessions may vary depending on applicable protocols and/or standards.

Here, the snooping STA 220 conducts the entire FTM session with the initiating STA 230. And because the initiating STA 230 has no way in which to determine the authenticity of the FTM exchange (e.g., whether it is with the intended responding STA 210), the initiating STA 230 conducts a transaction with the snooping STA 220 at block 240, based on the FTM measurement. Because this can involve the exchange of money, goods, and/or services, this type of snooping attack by the snooping STA 220 can be harmful to the responding STA 210 and/or the initiating STA 230.

Figure 3:
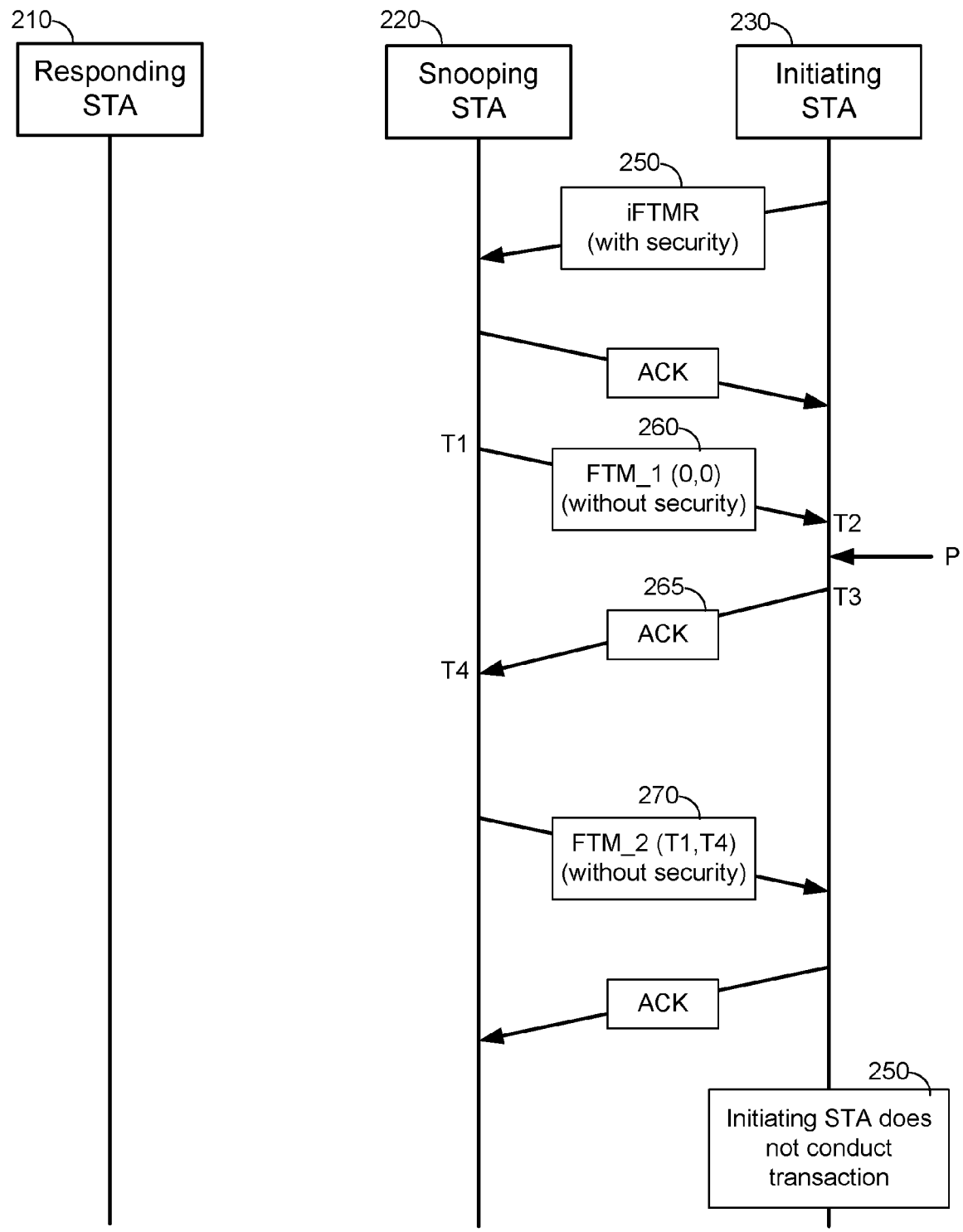
FIGS. 3-4 are call flow diagrams that illustrate how a security feature can be used, and how an initiating STA can respond to unauthenticated responses, according to some embodiments.
Figure 4:
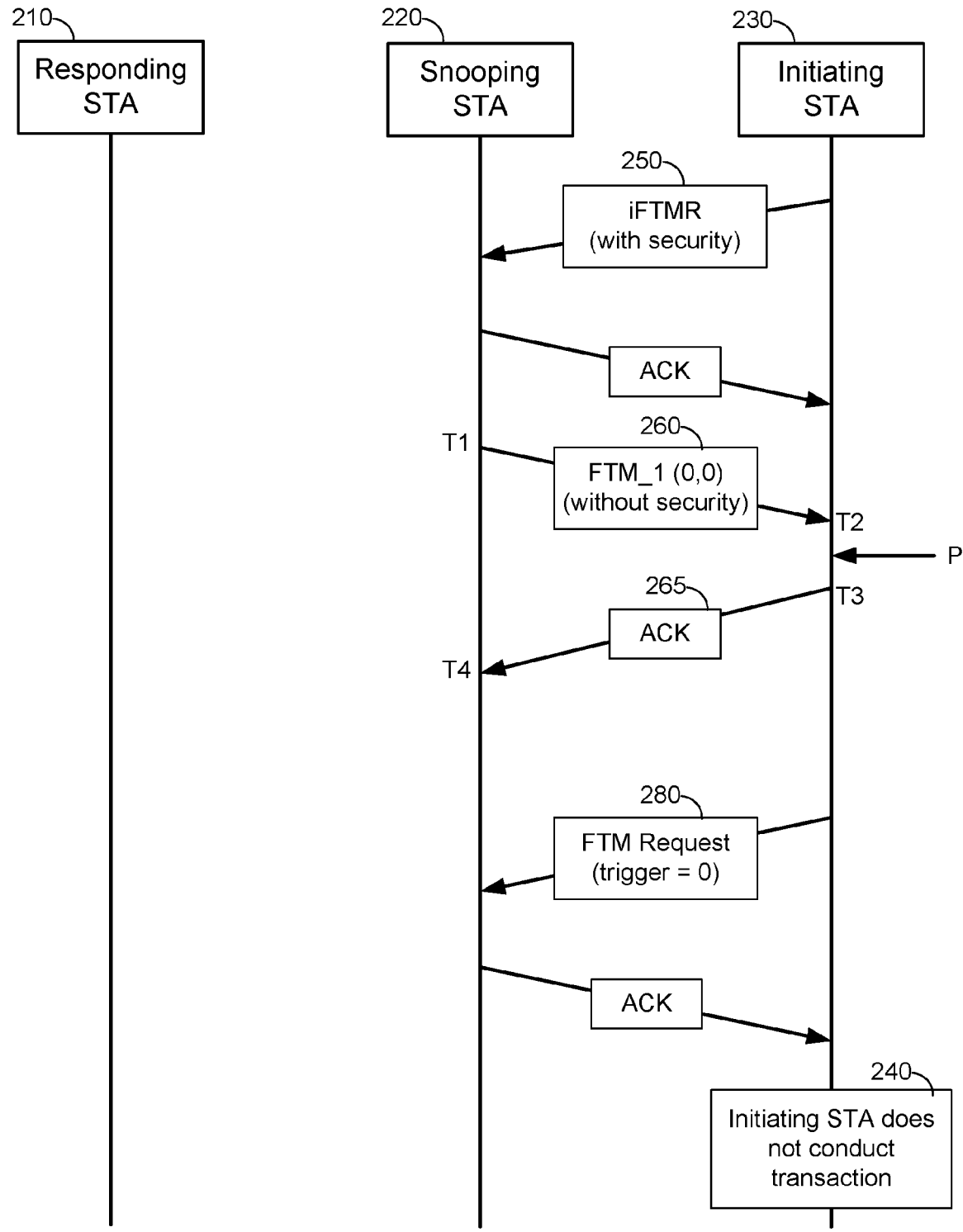

FIGS. 3-4 are call flow diagrams that illustrate how a security feature can be used, and how an initiating STA 230 can respond to unauthenticated responses, according to some embodiments.

In FIG. 3, for instance, the initiating STA 230 includes, in the iFTMR 250, a security feature that can be used by the initiating STA 230 to authenticate subsequent FTM frames. Examples of security features that can be included in the iFTMR 250 are discussed in more detail below. As also discussed in further detail below, the initiating STA 230 and responding STA 210 can share the security feature beforehand (using a secure data exchange), enabling the responding STA 210 to be able to include, in the FTM frames (260, 270) of an FTM session, a proper response to the security feature included in the iFTMR 250.

Because the snooping STA 220 does not have the ability to adequately respond to (or even identify) the security feature, FTM frames FTM_1 260 and FTM_2 270 sent by the snooping STA do not include security. More specifically, the FTM frames sent by the snooping STA may include information that inadequately responds to the security feature included in the iFTMR 250 sent by the initiating STA, or may omit any response to the security feature altogether.

Because the initiating STA 230 can readily determine the authenticity of the FTM frames sent by the snooping STA 220, the initiating STA 230 can respond accordingly. In the example illustrated in FIG. 3, the initiating STA completes the FTM session, but then does not conduct the related transaction, as indicated at block 250.

Alternative embodiments may respond differently, according to desired functionality. For example, because FTM_1 260 sent by the snooping STA 220 fails to include a sufficient response to the security feature of the iFTMR 250, the initiating STA 230 may determine at point P that the response is not authentic. Thus, according to some embodiments, the initiating STA 230 may end the FTM session early.

FIG. 4 is an illustration of such an embodiment. As shown in the call-flow diagram of FIG. 4, after determining that FTM_1 260 does not include a sufficient response to the security feature of the iFTMR 250 (e.g., the authenticity of FTM_1 cannot be verified), the initiating STA 230 can terminate the FTM session by sending a second FTM request 280, with a trigger value of 0. Again, the initializing STA then may not conduct the transaction, as indicated in block 240.

The security feature(s) implemented in various embodiments herein (including those illustrated in FIGS. 3 and 4) can include any of a variety of features that help determine the authenticity of the source of an FTM frame (e.g., FTM_1 260 and/or FTM_2 270).

For example, some embodiments may utilize a random nonce (number used once) sequence. In this embodiment, a random sequence of nonce values is securely negotiated between an initiating STA and a responding STA beforehand using an established infrastructure for security (e.g., using Wi-Fi®, Bluetooth® Low Energy (BT LE), and/or other wireless or wired technologies, which may use any of a variety of secure protocols, such as Secure Socket Layer (SSL), Transport Layer Security (TLS) Protocol, and the like). In some embodiments, this secure negotiation may be conducted directly between the initiating STA and the responding STA using a wireless connection. In other embodiments, this secure negotiation may occur indirectly via the Internet or other data communication network. Also, according to some embodiments, the secure negotiation may be initialized using an application executed by the responding STA. To increase the security of the nonce values, they may be time-dependent. That is, the initiating STA and the responding STA may negotiate or otherwise establish an expiration date and/or time after which the nonce values may not be used for FTM frame authentication.

Once a sequence of nonce values is exchanged, the initiating and responding STAs can utilize these values in an FTM session. For example, the initiating STA may include the first nonce value in the nonce sequence in an iFTMR, in which case the responding STA may include the next nonce value in the nonce sequence in the first FTM frame (FTM_1). The initiating STA and responding STA can continue to use these nonce values, one at a time, until they are finished conducting the FTM session.

It can be noted that, in alternative embodiments, values other than nonce values may be utilized in a similar manner. That is, a security feature used by the initiating STA and the responding STA may include a series of other values (pseudo-random numbers and/or other codes, etc.) where each value is used in a frame of the FTM session to allow an STA to authenticate the frame.

Some embodiments may additionally or alternatively use an at least partially-generated MAC address as a security feature. Here, the use of the at least partially-generated MAC address may be similar to the nonce value discussed above. That is, prior to the FTM session, the initiating STA and the responding STA may conduct a secure transaction in which a series of MAC addresses (or portions of MAC addresses) is exchanged. During the FTM session, the MAC addresses (or portions of MAC addresses) are used, one at a time, to authenticate the iFTMR and subsequent FTM frames in a manner similar to the nonce values described above.

According to some embodiments, only a part of the full MAC address would be generated and utilized in this manner, which can help reduce the power consumption of a filtering mechanism in the MAC layer. Thus, some embodiments may generate 3 bytes or less of the 6 byte MAC, which can reduce the power load of the filtering mechanism. (That said, other embodiments may generate more bytes of the MAC address or even the entire MAC address.) The sequence of at least partially-generated MAC addresses can then be used in the FTM session as described above. Because the filtering mechanism in the MAC layer will ignore information received in a packet from a MAC address not in the sequence, information from a snooping STA (which does not have the correct MAC address) will be ignored at the MAC layer.

Figure 5:
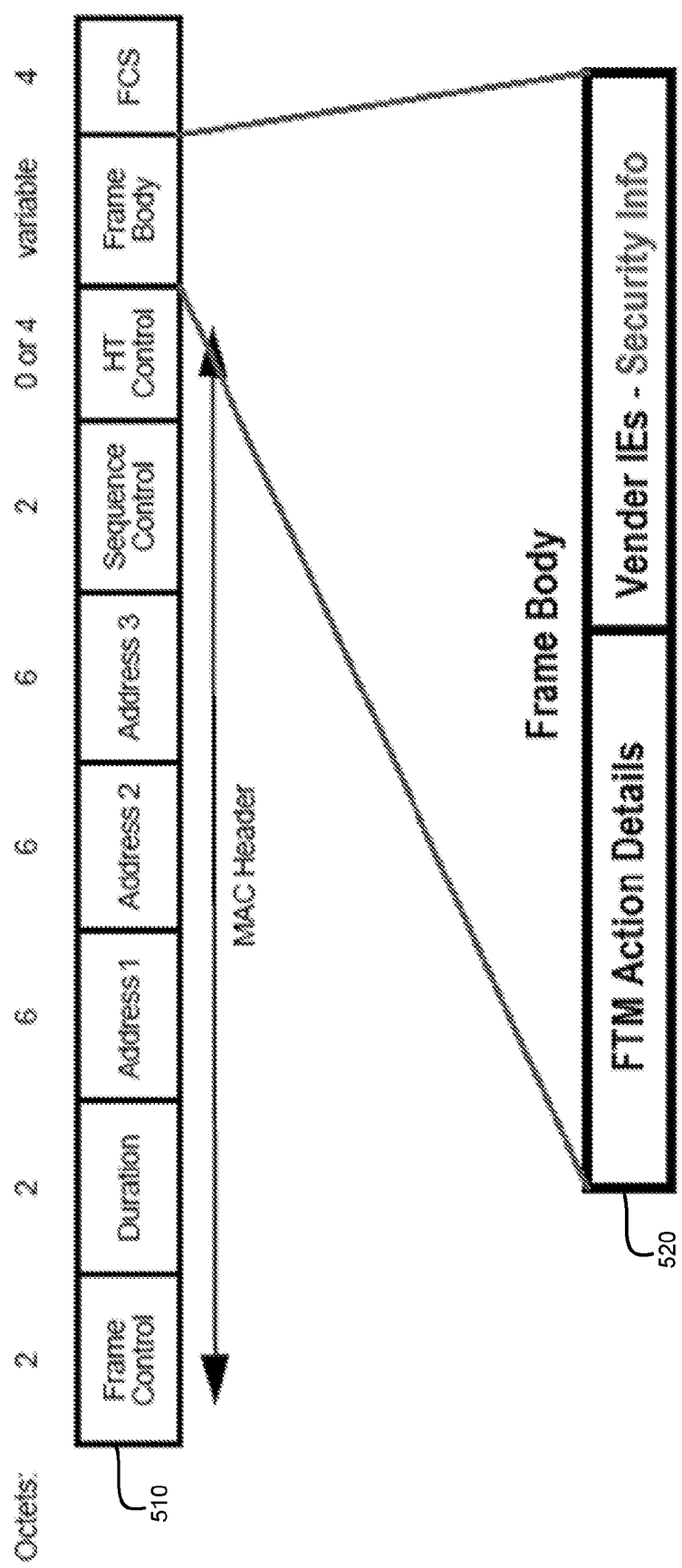
FIG. 5 is an illustration of an FTM frame having security information, according to an embodiment.

FIG. 5 is an illustration of an FTM frame 510 having security information, according to an embodiment. Here, the FTM frame 510 comprises a MAC header (having several fields, including up to three MAC addresses), a frame body, and a frame check sequence (FCS). FIG. 5 also includes an indication of the number of octets (or bytes) that may be included in each field of the MAC frame. It will be understood, however, that the content and/or format of an FTM frame may vary, depending on desired functionality, governing protocols and/or standards, and/or similar factors.

According to some embodiments, a security feature can be included in the frame body. In particular, the frame body 520 can include information elements (IEs) in which a nonce value or other security feature can be embedded. In some embodiments, a vendor IE may be utilized as the IE in which the security feature is embedded, due to the flexibility of the format of a vendor IE under the governing Institute of Electrical and Electronics Engineers (IEEE) standards.

Figure 6A:
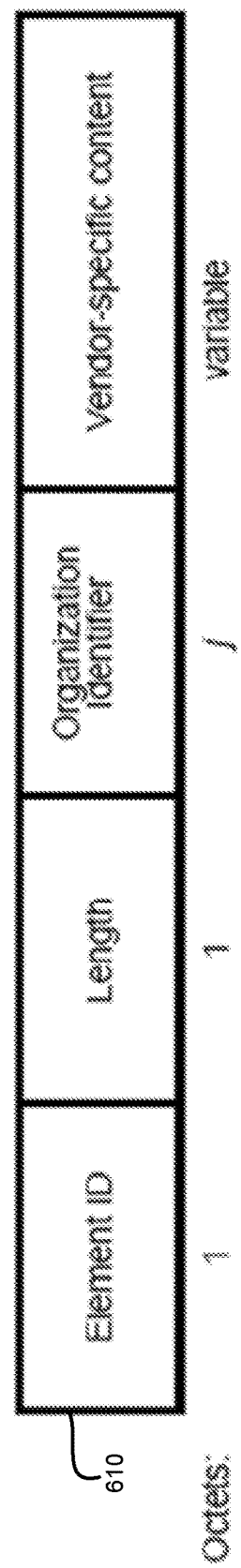
FIG. 6A is an illustration of an example format of a vendor IE that may be utilized in the frame body of FIG. 5.

FIG. 6A is an illustration of an example format of a vendor IE 610 that may be utilized in the frame body 520 of FIG. 5, including the length of each component of the vendor IE 610, in octets. The "Element ID" field of the vendor IE 610 can comprise an identifier that identifies the vendor IE 610 as such. The "Length" field can comprise an indication of the length of the vendor IE 610. In some embodiments this may comprise an indication of the length of the remaining fields of the vendor IE 610. The "Organization Identifier" field can include an identifier of a particular vendor (e.g., as designated by the IEEE). The "Vendor-specific content" field, which can be variable length, can include a security element, as utilized in the embodiments described herein above. In some embodiments, for example, this may include a random nonce element. The "Vendor-specific content" field may further comprise additional elements, depending on desired functionality.

Figure 6B:
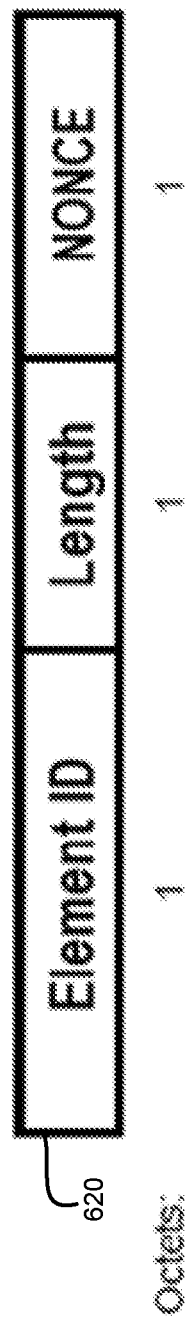
FIG. 6B is an illustration of an example format of a random nonce element that may be utilized in the "Vendor-specific content" field of the vendor IE of FIG. 6A

FIG. 6B is an illustration of an example format of a random nonce element 620 that may be utilized in the "Vendor-specific content" field of the vendor IE 610 of FIG. 6A. Here, the random nonce element includes three 1-octet fields: "Element ID," "Length," and "NONCE." The "Element ID" can comprise an identifier identifying the random nonce element 620 as such, and the "Length" field can indicate the length of the "NONCE" field of the random nonce element 620. Finally, the "NONCE" field can comprise the nonce value, which, as indicated in embodiments disclosed herein, may be one of a plurality of random nonce values in a predetermined sequence of random nonce values negotiated by the initiating STA and responding STA prior to the FTM session.

Referring again to FIG. 5, a security feature may be additionally or alternatively included in a MAC address of the MAC header. That is, in embodiments that utilize generated MAC addresses (e.g., in the manner described above), an at least partially-generated MAC address may be included in one of the fields set aside for MAC addresses in the MAC header of the FTM frame 510. (In FTM frame 510, "Address 1" can comprise the MAC address of the device sending the FTM frame 510, "Address 2" can comprise the MAC address of the device receiving the FTM frame 510, and "Address 3" can comprise the MAC address of a corresponding access point. Embodiments may choose to utilize any one of these three fields.) The field chosen to include the at least partially-generated MAC address may be determined ahead of time by governing standards and/or a designation in the secure communication in which the sequence of at least partially-generated MAC addresses are exchanged.

Figure 7:
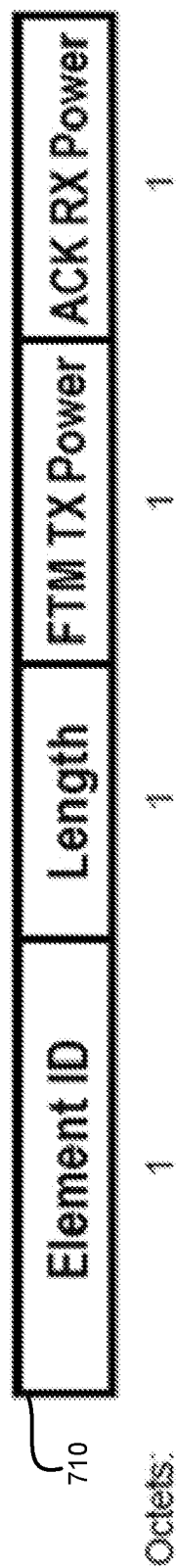
FIG. 7 is an illustration of a power indicator element that can be utilized in the embodiments described herein to further prevent "man in the middle" attacks by a snooping STA.

FIG. 7 is an illustration of a power indicator element 710 that can be utilized in the embodiments described herein to further prevent "man in the middle" attacks by a snooping STA. That is, embodiments provided herein can enable an initiating STA and responding STA to authenticate an iFTMR and subsequent FTM frames. However these embodiments may still be subject to "man in the middle" attacks in which a snooping STA is able to capture and replicate information transmitted between the responding and initiating STAs. As a measure to prevent these types of attacks, the power indicator element 710 can be utilized to calculate an amount of power loss in the transmittal and receipt of the iFTMR and subsequent FTM frames As with elements illustrated in FIGS. 6A and 6B, a power indicator element 710 can include "Element ID" and "Length" fields, respectively identifying the power indicator element 710 as such and indicating a length of the power indicator element 710. The power indicator element 710 can further include an "FTM TX Power" field that indicates a transmitted power of the FTM frame in which the power indicator element 710 is included. The power indicator element 710 can include an "ACK RX Power" field that indicates a received power of a previous ACK frame (or other previous frame, as may be the case). This information can help and STA calculate power loss (or path loss) between the initiating STA and the responding STA.

Referring to FIG. 3, as an example, if the snooping STA 220 sends FTM_1 260 without a proper response to the security element in the iFTMR 250, the initiating STA 230 can quickly determine that FTM_1 260 is not authentic. However, if the snooping STA 220 instead uses a "man in the middle" approach in which it receives the authentic FTM_1 260 generated by the responding STA 210 and sends that frame to the initiating STA 230, the initiating STA 230 may think that the FTM_1 260 received by the snooping STA 220 is authentic. However, if the FTM_1 260 further includes a power indicator element 710, the initiating STA 230 can calculate and compare the power loss of the iFTMR 250 with the power loss of the FTM_1 260 to determine whether there is a "man in the middle" attack. More specifically, the initiating STA 230 can subtract the received power of the FTM_1 260 from the transmitted power indicated in the power indicator element 710 to determine the power loss of the FTM_1 260. The initiating STA can then compare that with the power loss of the iFTMR 250, which is calculated by subtracting the received power in the power indicator element 710 from the transmitted power of the iFTMR 250. Because the snooping STA 220 is likely at a location different than the responding STA 210, the calculated power loss of the FTM_1 260 will likely be different than the calculated power loss of the iFTMR 250. Thus, If the calculated values are determined to be different (e.g., beyond a threshold value), then the initiating STA can determine that FTM_1 260 is not authentic and may then terminate the FTM session in accordance with embodiments described herein. In other embodiments, other frames in the FTM session may be utilized in this manner, and/or the responding STA 210 can also conduct power loss calculations to authenticate frames sent by the initiating STA 230.

Figure 8:
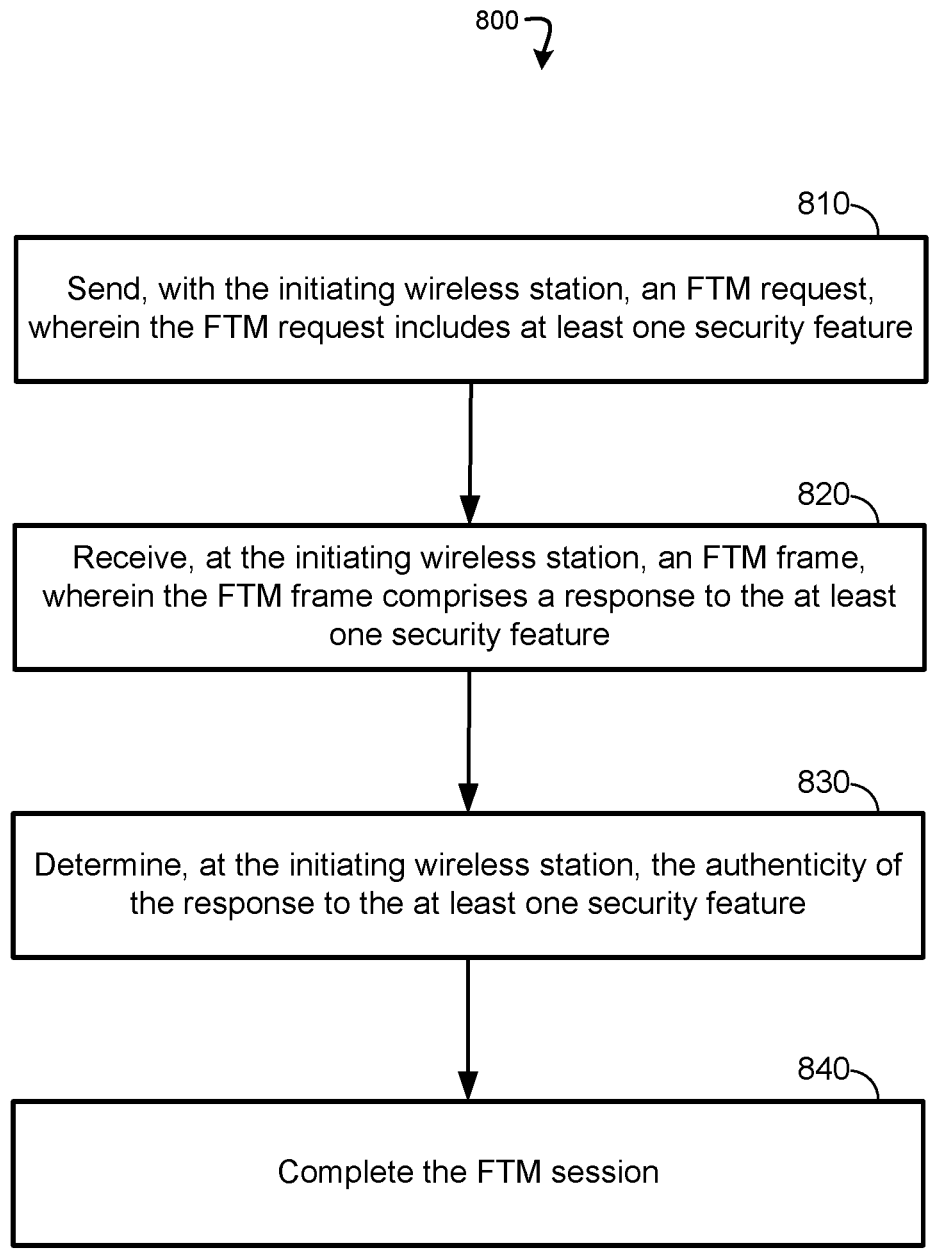
FIG. 8 is a method of providing security in a FTM session between an initiating wireless station and a responding wireless station

FIG. 8 is a method 800 of providing security in a FTM session between an initiating wireless station and a responding wireless station. According to some embodiments, the functionality of any or all of the blocks illustrated in method 800 can be performed by an initiating wireless station (such as the initiating STA described in the embodiments above). Means for performing the functions illustrated in method 800 can include software and/or hardware means as described herein below with regard to FIGS. 9 and/or 10, which may depend on the type of STAs utilized in the FTM session. Alternative embodiments include variations to the method 800 by inserting, omitting, combining, separating, and/or rearranging the functions illustrated in method 800.

Figure 9:
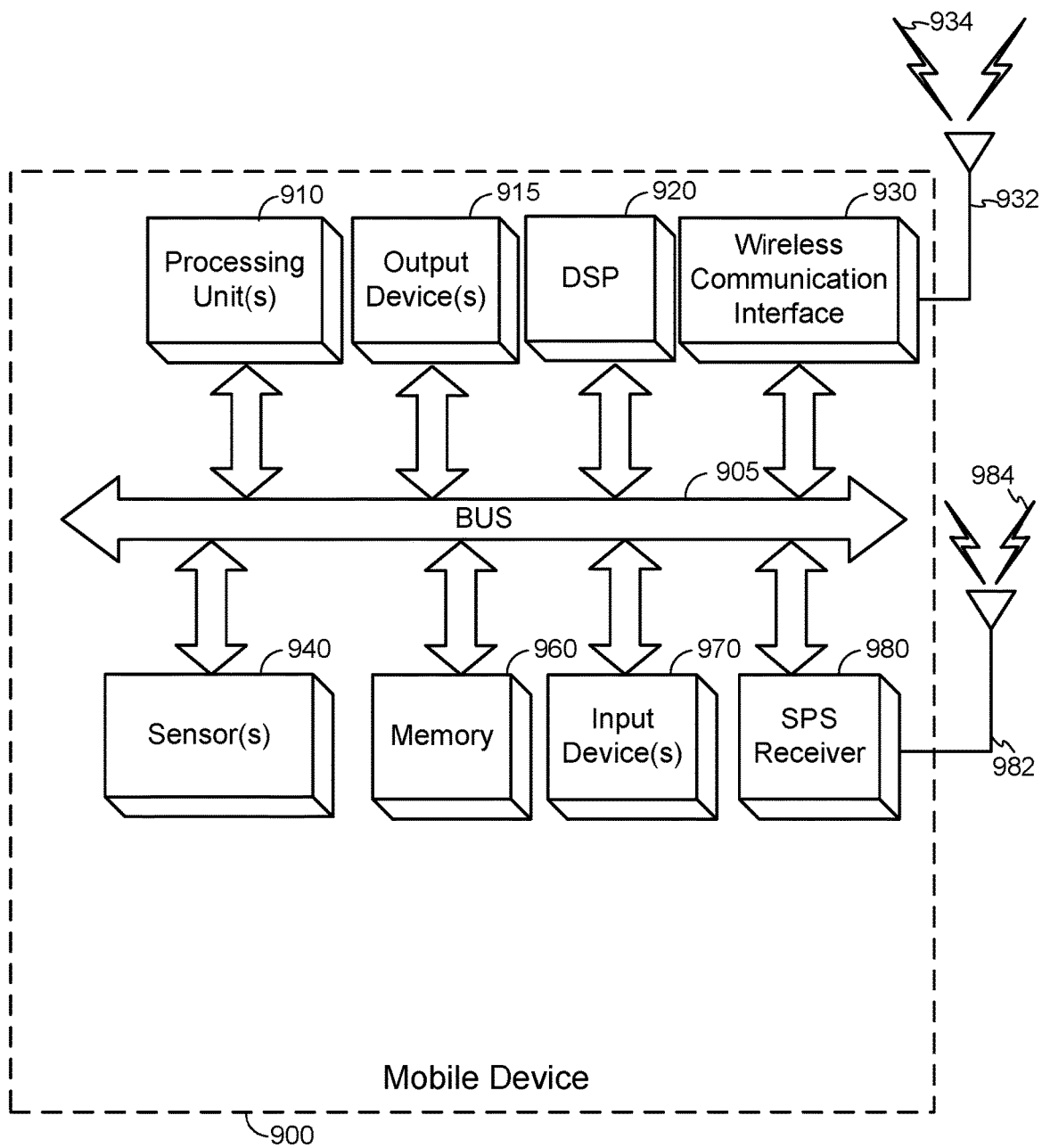
FIG. 9 illustrates an embodiment of a mobile device.
Figure 10:
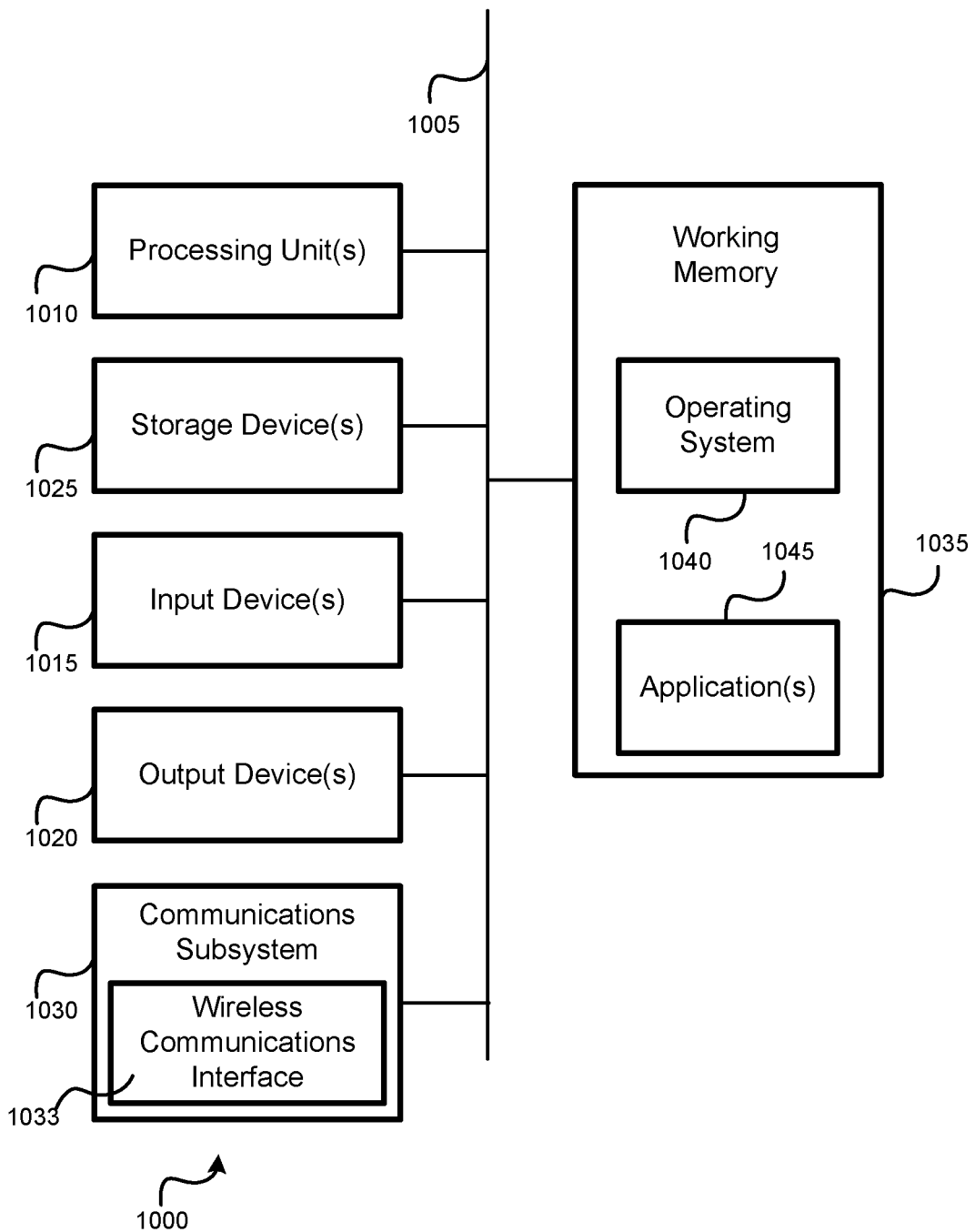
FIG. 10 illustrates an embodiment of a computer system.

The functionality at block 810 includes sending, with the initiating wireless station, an FTM request (e.g., an iFTMR), wherein the FTM request includes at least one security feature. As indicated in the embodiments above, the security feature can comprise information allowing subsequent FTM frames to be authenticated by including (in the subsequent FTM frames) information responsive to the security feature. Such security features can include, for example, a nonce value, and at least partially-generated MAC address, and the like. If the initiating wireless station is a mobile device, means for performing the functionality of block 810 can include, for example, processing unit(s) 910, bus 905, wireless communication interface 930, and/or memory 960 of a mobile device as illustrated in FIG. 9 and described in more detail below. More generically, if the wireless station is a computing device, means for performing the functionality of block 810 can include, for example, processing unit(s) 1010, bus 1005, storage device(s) 1025, communications subsystem 1030, and/or wireless communications interface 1033 of the computing system as illustrated in FIG. 10 and described in more detail below.

At block 820, functionality includes receiving, at the initiating wireless station, an FTM frame, where in the FTM frame comprises a response to the at least one security feature. As discussed in the embodiments detailed above, a response to the at least one security feature can include a nonce value (where the security feature is a nonce value), and at least partially-generated MAC address (where the security feature is an at least partially-generated MAC address), and the like. The response to the at least one security feature can be included in an FTM frame. The location of the response within the FTM frame can vary, depending on desired functionality. As detailed above, it may be included in the frame body (e.g., embedded within a vendor IE) and/or embedded in an MAC address field, according to some embodiments. If the initiating wireless station is a mobile device, means for performing the functionality of block 820 can include, for example, processing unit(s) 910, bus 905, wireless communication interface 930, and/or memory 960 of a mobile device as illustrated in FIG. 9 and described in more detail below. More generically, if the wireless station is a computing device, means for performing the functionality of block 820 can include, for example, processing unit(s) 1010, bus 1005, storage device(s) 1025, communications subsystem 1030, and/or wireless communications interface 1033 of the computing system as illustrated in FIG. 10 and described in more detail below.

At block 830, the authenticity of the response to the at least one security feature is determined at the initiating wireless station. According to some embodiments, this determination may be made by analyzing the response to the at least one security feature to determine whether the response is correct. This analysis may include determining whether the response corresponds to a subsequent value in a predetermined sequence of values (e.g., nonce values, at least partially-generated MAC addresses, etc.), which may be stored in a data structure (e.g., lookup table, database, etc.) by the initiating wireless station. If the initiating wireless station is a mobile device, means for performing the functionality of block 830 can include, for example, processing unit(s) 910, bus 905, and/or memory 960 of a mobile device as illustrated in FIG. 9 and described in more detail below. More generically, if the wireless station is a computing device, means for performing the functionality of block 830 can include, for example, processing unit(s) 1010, bus 1005, and/or storage device(s) 1025 of the computing system as illustrated in FIG. 10 and described in more detail below.

At block 840, the FTM session is completed. As indicated in the examples provided herein, the determination that the response to the at least one security feature is authentic or not authentic can dictate how the initiating wireless station may complete the FTM session. For example, if the initiating wireless station makes a determination that the response to the at least one security feature is not authentic, the initiating wireless station can, for example, continuing to send ACK frames and/or other information according to governing FTM protocol, but then choose to not conduct a subsequent transaction (as shown in the embodiment illustrated in FIG. 3). In other embodiments, the initiating wireless station can complete the FTM session by terminating the FTM session prematurely (as shown in the embodiment illustrated in FIG. 4). If the initiating wireless station is a mobile device, means for performing the functionality of block 840 can include, for example, processing unit(s) 910, bus 905, wireless communication interface 930, and/or memory 960 of a mobile device as illustrated in FIG. 9 and described in more detail below. More generically, if the wireless station is a computing device, means for performing the functionality of block 840 can include, for example, processing unit(s) 1010, bus 1005, storage device(s) 1025, communications subsystem 1030, and/or wireless communications interface 1033 of the computing system as illustrated in FIG. 10 and described in more detail below.

Embodiments may include additional features, depending on desired functionality. For example, embodiments may further comprise negotiating a random sequence of nonce values over a secure network, wherein the at least one security feature of the FTM request comprises at least a portion of the random sequence of nonce values. In some embodiments, a validity of the sequence of nonce values may be time dependent. In some embodiments, the at least one security feature of the FTM request may be included in a vendor-specific IE within a frame body of the FTM request. In some embodiments, the at least one security feature of the FTM request may comprise a first MAC address, wherein at least a portion of the first MAC address comprises a first predetermined value (e.g., a first value of a series of values, which may have been pre-negotiated by the initiating wireless device and a responding wireless device). Information responsive to the first MAC address may include a second MAC address that comprises a second predetermined value. In some embodiments, only a portion of the first MAC address (e.g., no more than three bytes) may include the first predetermined value.

Additionally or alternatively, embodiments may include features that calculate path loss to prevent "man in the middle" attacks, as discussed in embodiments herein. For example, methods may further include receiving an acknowledgment frame, determining an amount of path loss and each of the FTM request and the acknowledgment frame, based on information received in the acknowledgment frame. The method can then further comprise comparing the amount of path loss in the FTM request with the amount of path loss in the acknowledgment frame and terminating the FTM session if the amount of path loss in the FTM request and the amount of path loss in the acknowledgment frame are not substantially similar (e.g., within a threshold amount). According to some embodiments, determining the amount of path loss and each of the FTM request and the acknowledgment frame can include determining a transmitted power of the FTM request, receiving, in the acknowledgment frame, an indication of a received power of the FTM request and a transmitted power of the acknowledgment frame, and determining a received power of the acknowledgment frame. Embodiments may further include determining the amount of path loss in the FTM request by subtracting the received power of the FTM request from the transmitted power of the FTM request and determining the amount of path loss in the acknowledgment frame by subtracting the received power of the acknowledgment frame from the transmitted power the acknowledgment frame.

FIG. 9 illustrates an embodiment of a mobile device 900, which can be utilized as a STA (initiating and/or responding), as described herein. It should be noted that FIG. 9 is meant only to provide a generalized illustration of various components, any or all of which may be utilized as appropriate. It can be noted that, in some instances, components illustrated by FIG. 9 can be localized to a single physical device and/or distributed among various networked devices, which may be disposed at different physical locations.

The mobile device 900 is shown comprising hardware elements that can be electrically coupled via a bus 905 (or may otherwise be in communication, as appropriate). The hardware elements may include a processing unit(s) 910 which may comprise without limitation one or more general-purpose processors, one or more special-purpose processors (such as digital signal processing (DSP) chips, graphics acceleration processors, application specific integrated circuits (ASICs), and/or the like), and/or other processing structure or means, which can be configured to perform one or more of the methods described herein. As shown in FIG. 9, some embodiments may have a separate DSP 920, depending on desired functionality. The mobile device 900 also may comprise one or more input devices 970, which may comprise without limitation one or more touch screens, touch pads, microphones, buttons, dials, switches, and/or the like; and one or more output devices 915, which may comprise without limitation, one or more displays, light emitting diode (LED)s, speakers, and/or the like.

The mobile device 900 might also include a wireless communication interface 930, which may comprise without limitation a modem, a network card, an infrared communication device, a wireless communication device, and/or a chipset (such as a Bluetooth® device, an IEEE 802.11 device, an IEEE 802.15.4 device, a Wi-Fi® device, a WiMax® device, cellular communication facilities, etc.), and/or the like. The wireless communication interface 930 may permit data to be communicated with a network (e.g., a wireless wide area network WWAN), wireless access points, other computer systems, and/or any other electronic devices described herein. The communication can be carried out via one or more wireless communication antenna(s) 932 that send and/or receive wireless signals 934.

Depending on desired functionality, the wireless communication interface 930 may comprise separate transceivers to communicate with other devices, including other STAs. These different data networks may comprise various network types. Additionally, a WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMax (IEEE 802.16), and so on. A CDMA network may implement one or more radio access technologies (RATs) such as cdma2000, Wideband-CDMA (W-CDMA), and so on. Cdma2000 includes IS-95, IS-2000, and/or IS-856 standards. A TDMA network may implement Global System for Mobile Communications (GSM), Digital Advanced Mobile Phone System (D-AMPS), or some other RAT. An OFDMA network may employ LTE, LTE Advanced, and so on. LTE, LTE Advanced, GSM, and W-CDMA are described in documents from 3GPP. Cdma2000 is described in documents from a consortium named "3rd Generation Partnership Project 2" (3GPP2). 3GPP and 3GPP2 documents are publicly available. A WLAN may also be an IEEE 802.11x network, and a WPAN may be a Bluetooth network, an IEEE 802.15x, or some other type of network. The techniques described herein may also be used for any combination of WWAN, WLAN and/or WPAN.

The mobile device 900 can further include sensor(s) 940. Such sensors may comprise, without limitation, one or more accelerometer(s), gyroscope(s), camera(s), magnetometer(s), altimeter(s), microphone(s), proximity sensor(s), light sensor(s), and the like. Some or all of the sensor(s) 940 can be utilized, among other things, positioning methods.

Embodiments of the mobile device may also include a satellite positioning system (SPS) receiver 980 capable of receiving signals 984 from one or more SPS satellites using an SPS antenna 982. Such positioning can be utilized to complement and/or incorporate the techniques described herein. The SPS receiver 980 can extract a position of the mobile device, using conventional techniques, from SPS SVs of an SPS system, such as GNSS (e.g., Global Positioning System (GPS)), Galileo, Glonass, Compass, Quasi-Zenith Satellite System (QZSS) over Japan, Indian Regional Navigational Satellite System (IRNSS) over India, Beidou over China, and/or the like. Moreover, the SPS receiver 980 can be used various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

The mobile device 900 may further include and/or be in communication with a memory 960. The memory 960 may comprise, without limitation, local and/or network accessible storage, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The memory 960 of the mobile device 900 also can comprise software elements (not shown), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the functionality discussed above might be implemented as code and/or instructions executable by the mobile device 900 (and/or a processing unit within a mobile device 900) (and/or another device of a positioning system). In an aspect, then, such code and/or instructions can be used to configure and/or adapt a general purpose computer (or other device) to perform one or more operations in accordance with the described methods.

FIG. 10 illustrates an embodiment of a computer system 1000, which may comprise or be incorporated, at least in part, into devices capable of operating as a STA (initiating and/or responding) as described herein above. In contrast to a mobile device (e.g., mobile device 900 of FIG. 9), the computer system 1000 may be a fixed or partially-fixed device, which may or may not be considered movable or mobile. In some embodiments, the computer system may comprise a vending machine, point-of-sale device, automated teller machine (ATM), and/or the like. FIG. 10 provides a schematic illustration of one embodiment of a computer system 1000 that can perform methods of the previously-described embodiments. It should be noted that FIG. 10 is meant only to provide a generalized illustration of various components, any or all of which may be utilized as appropriate. FIG. 10, therefore, broadly illustrates how individual system elements may be implemented in a relatively separated or relatively more integrated manner. In addition, it can be noted that components illustrated by FIG. 10 can be localized to a single device and/or distributed among various networked devices, which may be disposed at different physical locations.

The computer system 1000 is shown comprising hardware elements that can be electrically coupled via a bus 1005 (or may otherwise be in communication, as appropriate). The hardware elements may include processing unit(s) 1010, which may comprise without limitation one or more general-purpose processors, one or more special-purpose processors (such as digital signal processing chips, graphics acceleration processors, and/or the like), and/or other processing structure, which can be configured to perform one or more of the methods described herein. The computer system 1000 also may comprise one or more input devices 1015, which may comprise without limitation a mouse, a keyboard, a camera, a microphone, and/or the like; and one or more output devices 1020, which may comprise without limitation a display device, a printer, and/or the like.

The computer system 1000 may further include (and/or be in communication with) one or more non-transitory storage devices 1025, which can comprise, without limitation, local and/or network accessible storage, and/or may comprise, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The computer system 1000 might also include a communications subsystem 1030, which may comprise wireless communication technologies managed and controlled by a wireless communications interface 1033, as well as wired technologies. As such, the communications subsystem may comprise a modem, a network card (wireless or wired), an infrared communication device, a wireless communication device, and/or a chipset (such as a Bluetooth® device, an IEEE 802.11 device, an IEEE 802.15.4 device, a Wi-Fi® device, a WiMax® device, cellular communication facilities, ultra wideband (UWB) interface, etc.), and/or the like. The communications subsystem 1030 may include one or more input and/or output communication interfaces, such as the wireless communications interface 1033, to permit data to be exchanged with a network, mobile devices (such as the mobile device 900 of FIG. 9), other computer systems, and/or any other electronic devices described herein. Hence, the communications subsystem 1030 may be used to receive and send data as described in the embodiments herein.

In many embodiments, the computer system 1000 will further comprise a working memory 1035, which may comprise a RAM or ROM device, as described above. Software elements, shown as being located within the working memory 1035, may comprise an operating system 1040, device drivers, executable libraries, and/or other code, such as one or more applications 1045, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processing unit within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 1025 described above. In some cases, the storage medium might be incorporated within a computer system, such as computer system 1000. In other embodiments, the storage medium might be separate from a computer system (e.g., a removable medium, such as an optical disc), and/or provided in an installation package, such that the storage medium can be used to program, configure, and/or adapt a general purpose computer with the instructions/code stored thereon. These instructions might take the form of executable code, which is executable by the computer system 1000 and/or might take the form of source and/or installable code, which, upon compilation and/or installation on the computer system 1000 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

With reference to the appended figures, components that may comprise memory may comprise non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media, volatile media, and transmission media. Common forms of computer-readable media include, for example, magnetic and/or optical media, punchcards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it is intended that claimed subject matter not be limited to the particular examples disclosed, but that such claimed subject matter may also include all aspects falling within the scope of appended claims, and equivalents thereof.

What is claimed is:

1. A method of providing security in a Fine Timing Measurement (FTM) session between an initiating wireless station and a responding wireless station, the method comprising:
   negotiating, between the initiating wireless station and the responding wireless station, at least one value over a secure network before initiating the FTM session, the at least one value comprising:
      a random sequence of nonce values, or
      a first predetermined value;
   initiating the FTM session by sending, with the initiating wireless station, an FTM request, wherein the FTM request includes at least one security feature, wherein the at least one security feature of the FTM request comprises:
      at least a portion of the random sequence of nonce values included in a vendor-specific information element (IE) of a frame body of the FTM request, or
      a first media access control (MAC) address included in a MAC header of the FTM request, wherein at least a portion of the first MAC address comprises the first predetermined value;
   receiving, at the initiating wireless station, an FTM frame, wherein the FTM frame comprises a response to the at least one security feature;
   determining, at the initiating wireless station, an authenticity of the response to the at least one security feature; and
   completing the FTM session.

2. The method of claim 1, wherein completing the FTM session comprises terminating the FTM session based on a determination that the response to the at least one security feature is not authentic.

3. The method of claim 2, wherein the determination that the response to the at least one security feature is not authentic comprises a determination that the FTM frame contains incorrect information responsive to the at least one security feature of the FTM request.

4. The method of claim 1, wherein completing the FTM session is based on a determination that the response to the at least one security feature is authentic.

5. The method of claim 1, wherein the at least one value negotiated over the secure network comprises the random sequence of nonce values, the at least one security feature of the FTM request comprises the at least a portion of the random sequence of nonce values, and a validity of the random sequence of nonce values is time dependent.

6. The method of claim 1, wherein the at least one value negotiated over the secure network comprises the first predetermined value, the at least one security feature of the FTM request comprises the first MAC address, and information responsive to the at least one security feature of the FTM request comprises a second MAC address, wherein at least a portion of the second MAC address comprises a second predetermined value.

7. The method of claim 1, wherein the at least one value negotiated over the secure network comprises the first predetermined value, the at least one security feature of the FTM request comprises the first MAC address, and no more than three bytes of the first MAC address comprises the first predetermined value.

8. The method of claim 1, further comprising:
   receiving an acknowledgement frame;
   determining an amount of path loss in each of the FTM request and the acknowledgement frame based on information received in the acknowledgement frame;
   comparing the amount of path loss in the FTM request with the amount of path loss in the acknowledgement frame; and
   terminating the FTM session if the amount of path loss in the FTM request and the amount of path loss in the acknowledgement frame are not substantially similar.

9. The method of claim 8, wherein determining the amount of path loss in each of the FTM request and the acknowledgement frame comprises:
   determining a transmitted power of the FTM request;
   receiving, in the acknowledgement frame, an indication of:
      a received power of the FTM request, and
      a transmitted power of the acknowledgement frame;
   determining a received power of the acknowledgement frame;
   determining the amount of path loss in the FTM request by subtracting the received power of the FTM request from the transmitted power of the FTM request; and
   determining the amount of path loss in the acknowledgement frame by subtracting the received power of the acknowledgement frame from the transmitted power of the acknowledgement frame.

10. A device comprising an initiating wireless station in a Fine Timing Measurement (FTM) session between the initiating wireless station and a responding wireless station, the device comprising:
    a wireless communication interface;
    a memory; and
    a processing unit communicatively connected to the wireless communication interface and the memory, the processing unit configured to cause the device to:
       negotiate, with the responding wireless station, at least one value over a secure network before initiating the FTM session, the at least one value comprising:
          a random sequence of nonce values, or
          a first predetermined value;
       initiate the FTM session by sending, via the wireless communication interface, an FTM request, wherein the FTM request includes at least one security feature, wherein the at least one security feature of the FTM request comprises:
          at least a portion of the random sequence of nonce values included in a vendor-specific information element (IE) of a frame body of the FTM request, or
          a first media access control (MAC) address included in a MAC header of the FTM request, wherein at least a portion of the first MAC address comprises the first predetermined value;
       receive, via the wireless communication interface, an FTM frame, wherein the FTM frame comprises a response to the at least one security feature;
       determine an authenticity of the response to the at least one security feature; and
       complete the FTM session.

11. The device of claim 10, wherein the processing unit is configured to cause the device to complete the FTM session by terminating the FTM session based on a determination that the response to the at least one security feature is not authentic.

12. The device of claim 11, wherein the processing unit is configured to cause the device to determine that the response to the at least one security feature is not authentic by determining that the FTM frame contains incorrect information responsive to the at least one security feature of the FTM request.

13. The device of claim 10, wherein the processing unit is configured to cause the device to complete the FTM session based on a determination that the response to the at least one security feature is authentic.

14. The device of claim 10, wherein the processing unit is configured to cause the device to negotiate the at least one value over the secure network comprising the random sequence of nonce values, the at least one security feature of the FTM request comprises the at least a portion of the random sequence of nonce values, and a validity of the random sequence of nonce values is time dependent.

15. The device of claim 10, wherein the at least one value negotiated over the secure network comprises the first predetermined value, the at least one security feature of the FTM request comprises the first MAC address, and information responsive to the at least one security feature of the FTM request comprises a second MAC address, wherein at least a portion of the second MAC address comprises a second predetermined value.

16. The device of claim 10, wherein the processing unit is configured to cause the device to:
receive, via the wireless communication interface, an acknowledgement frame;
determine an amount of path loss in each of the FTM request and the acknowledgement frame based on information received in the acknowledgement frame;
compare the amount of path loss in the FTM request with the amount of path loss in the acknowledgement frame; and
terminate the FTM session if the amount of path loss in the FTM request and the amount of path loss in the acknowledgement frame are not substantially similar.

17. The device of claim 16, wherein the processing unit is configured to cause the device to determine the amount of path loss in each of the FTM request and the acknowledgement frame by:
determining a transmitted power of the FTM request;
receiving, in the acknowledgement frame, an indication of:
a received power of the FTM request, and
a transmitted power of the acknowledgement frame;
determining a received power of the acknowledgement frame;
determining the amount of path loss in the FTM request by subtracting the received power of the FTM request from the transmitted power of the FTM request; and
determining the amount of path loss in the acknowledgement frame by subtracting the received power of the acknowledgement frame from the transmitted power of the acknowledgement frame.

18. The device of claim 10, wherein the at least one value negotiated over the secure network comprises the first predetermined value, the at least one security feature of the FTM request comprises the first MAC address, and no more than three bytes of the first MAC address comprises the first predetermined value.

19. An apparatus providing security in a Fine Timing Measurement (FTM) session between an initiating wireless station and a responding wireless station, the apparatus comprising:
means for negotiating, between the initiating wireless station and the responding wireless station, at least one value over a secure network before the FTM session is initiated, the at least one value comprising:
a random sequence of nonce values, or
a first predetermined value;
means for initiating the FTM session by sending, with the initiating wireless station, an FTM request, wherein the FTM request includes at least one security feature, wherein the at least one security feature of the FTM request comprises:
at least a portion of the random sequence of nonce values included in a vendor-specific information element (IE) of a frame body of the FTM request, or
a first media access control (MAC) address included in a MAC header of the FTM request, wherein at least a portion of the first MAC address comprises the first predetermined value;
means for receiving, at the initiating wireless station, an FTM frame, wherein the FTM frame comprises a response to the at least one security feature;
means for determining, at the initiating wireless station, an authenticity of the response to the at least one security feature; and
means for completing the FTM session.

20. The apparatus of claim 19, wherein the means for completing the FTM session comprises means for terminating the FTM session based on a determination that the response to the at least one security feature is not authentic.

21. The apparatus of claim 19, wherein the means for completing the FTM session comprises means for determining that the response to the at least one security feature is authentic.

22. The apparatus of claim 19, wherein the means for negotiating the at least one value over the secure network comprise means for negotiating the random sequence of nonce values, the at least one security feature of the FTM request comprises the at least a portion of the random sequence of nonce values, and a validity of the random sequence of nonce values is time dependent.

23. The apparatus of claim 19, wherein the at least one value negotiated over the secure network comprises the first predetermined value, the at least one security feature of the FTM request comprises the first MAC address, and information responsive to the at least one security feature of the FTM request comprises a second MAC address, wherein at least a portion of the second MAC address comprises a second predetermined value.

24. The apparatus of claim 19, further comprising:
means for receiving an acknowledgement frame;
means for determining an amount of path loss in each of the FTM request and the acknowledgement frame based on information received in the acknowledgement frame;
means for comparing the amount of path loss in the FTM request with the amount of path loss in the acknowledgement frame; and
means for terminating the FTM session if the amount of path loss in the FTM request and the amount of path loss in the acknowledgement frame are not substantially similar.

25. The apparatus of claim 24, wherein the means for determining the amount of path loss in each of the FTM request and the acknowledgement frame comprises:
means for determining a transmitted power of the FTM request;
means for receiving, in the acknowledgement frame, an indication of:
a received power of the FTM request, and
a transmitted power of the acknowledgement frame;
means for determining a received power of the acknowledgement frame;

means for determining the amount of path loss in the FTM request by subtracting the received power of the FTM request from the transmitted power of the FTM request; and means for determining the amount of path loss in the acknowledgement frame by subtracting the received power of the acknowledgement frame from the transmitted power of the acknowledgement frame.

26. The apparatus of claim 19, wherein the at least one value negotiated over the secure network comprises the first predetermined value, the at least one security feature of the FTM request comprises the first MAC address, and no more than three bytes of the first MAC address comprises the first predetermined value.

27. A non-transitory computer-readable-medium having instructions embedded therein for providing security in a Fine Timing Measurement (FTM) session between an initiating wireless station and a responding wireless station, the instructions comprising computer code for:

negotiating, between the initiating wireless station and the responding wireless station, at least one value over a secure network before the FTM session is initiated, the at least one value comprising:

a random sequence of nonce values, or a first predetermined value;

initiating the FTM session by sending, with the initiating wireless station, an FTM request, wherein the FTM request includes at least one security feature, wherein the at least one security feature of the FTM request comprises:

at least a portion of the random sequence of nonce values included in a vendor-specific information element (IE) of a frame body of the FTM request, or a first media access control (MAC) address included in a MAC header of the FTM request, wherein at least a portion of the first MAC address comprises the first predetermined value;

receiving, at the initiating wireless station, an FTM frame, wherein the FTM frame comprises a response to the at least one security feature;

determining, at the initiating wireless station, an authenticity of the response to the at least one security feature; and completing the FTM session.

* * * * *